May 27, 1941.     L. G. PLANT     2,243,119
WROUGHT WELDED VALVE BODY AND METHOD OF MAKING THE SAME
Original Filed Dec. 7, 1936     2 Sheets-Sheet 1
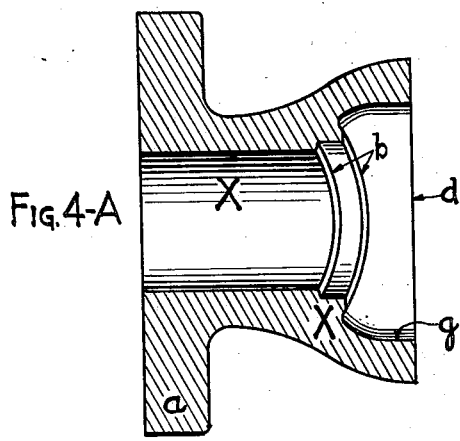
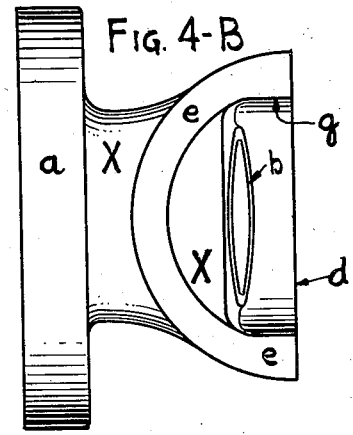
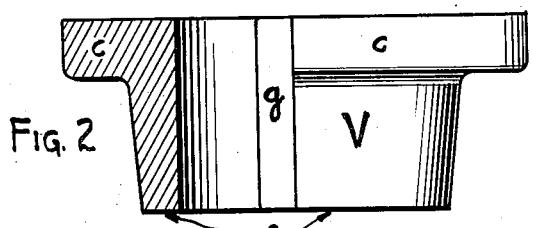
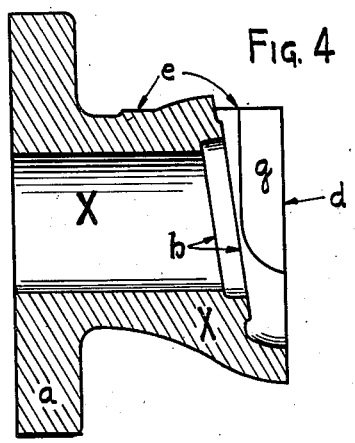
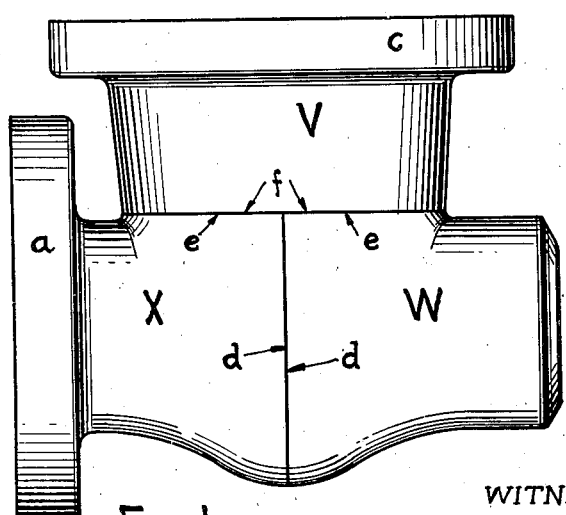
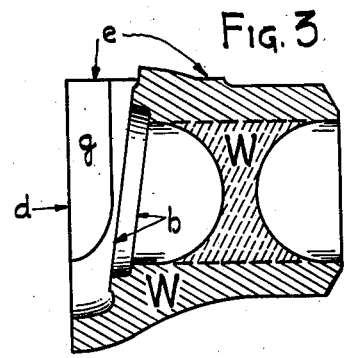
INVENTOR.
L. G. Plant
by M. H. Lane
Atty.
WITNESS
M. K. Schrock

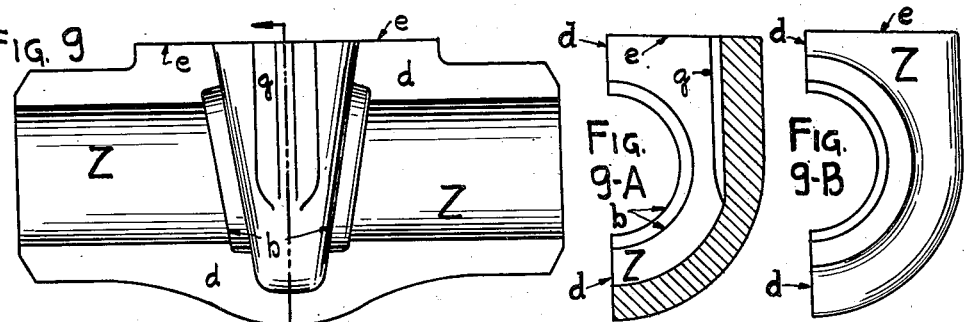
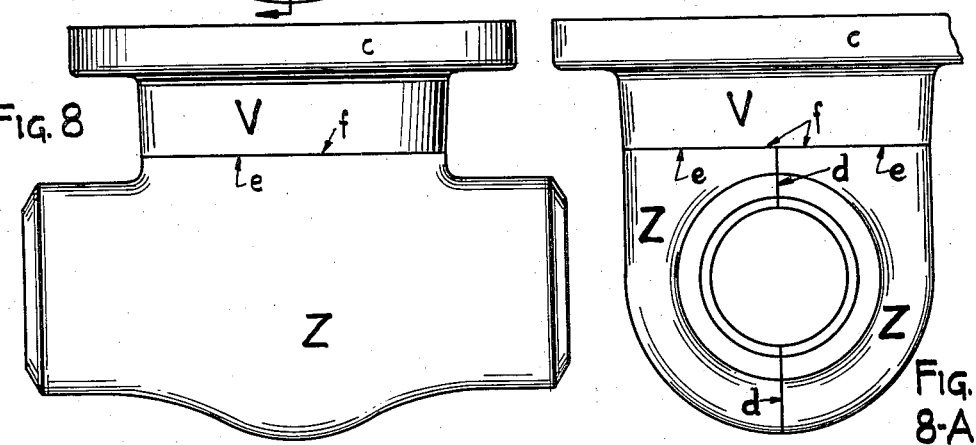
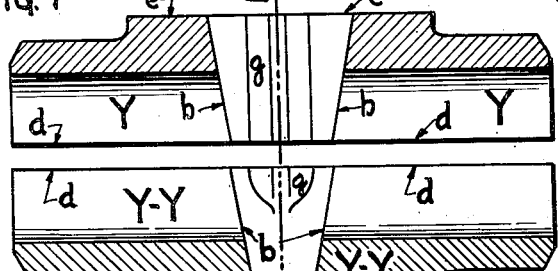
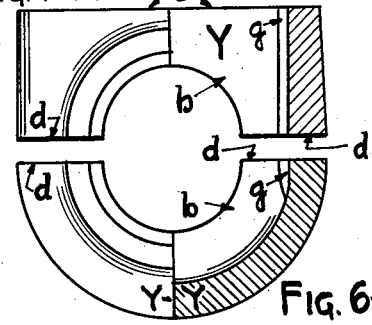
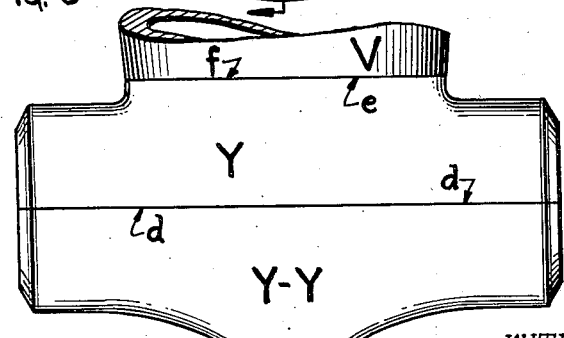

Patented May 27, 1941

2,243,119

UNITED STATES PATENT OFFICE 2,243,119

WROUGHT WELDED VALVE BODY AND METHOD OF MAKING THE SAME

Leland G. Plant, Washington, D. C.

Application December 7, 1936, Serial No. 114,682
Renewed November 7, 1939

5 Claims. (Cl. 29—157.1)

This invention is an improvement in the fabrication of forged or wrought metal into valve bodies. It applies generally to valves of the gate type and particularly to the fabrication thereof by welding wherein it is sought to produce an improved construction from the simplest forged forms that can be assembled with the least welding expense.

The important structural principle of applicant's earlier invention, Patent No. 2,054,445, issued September 15, 1936, is preserved in the present invention through the use of simple cylindrical wrought metal sections to produce an axially rigid port-supporting barrel upon which is imposed the gate recess chamber wall, welded to said barrel in a continuous line surrounding the gate aperture.

The present invention is for a novel design and arrangement of cylindrical or semi-cylindrical forged parts so shaped that they can be fused and bonded together along contacting edges, entirely by a process of fusion welding (without the addition of welding metal), to produce a structurally rigid port supporting barrel, in combination with the annular wall of a gate recess chamber fused and bonded along its end to said barrel by this same fusion process of welding which requires no additional welding metal.

As referred to in this application, the practice of fusion welding (without the addition of welding metal), may be a process of passing an electric current through the two bodies to be bonded as they are first contacted along the surfaces to be bonded, then drawing these surfaces slightly apart to produce an arc moving over said surfaces until the entire area thereof is in a molten state, after which said surfaces are pressed together with sufficient force to squeeze out flowing metal and bring the surfaces into a solidly bonded state.

To accomplish this process of welding, it is desirable that the surfaces to be bonded lie in substantially parallel planes so that the electric arc will be conducted over their entire area. The novelty of my invention and ingenuity of its development lies largely in its accomplishment of a complete valve body entirely from simple, cylindrically shaped parts that can each be forged about one axis and which can each be bonded to the other as required for this construction, entirely along broad and substantially flat surfaces of contact in the same plane.

Several types of valves having wrought metal bodies of various shapes that may be brought together by a process of fusion welding are disclosed in prior patents. My construction is distinct from and superior to these references in that they are built up from bi-axial forgings in which some portion of the through barrel and approximately one-half of the entire gate recess wall must first be forged integrally from the same dies, whereas I am able to utilize shapes forged about a single axis which can be assembled entirely by a process of fusion welding into an axially rigid, port-supporting, through barrel to which an annular gate recess wall can be applied by the same process.

The use of mono-axial cylindrical forgings from which a valve body can be entirely assembled is also found in prior disclosures. The present invention differs from these by a new combination of simple forged shapes having the distinct advantage over all earlier constructions from mono-axial cylindrical forgings, of enabling all of these parts to be assembled cheaply by fusion welding, without the addition of welding metal.

The advantage of a valve body construction that can be assembled entirely by fusion welding of mono-axial, cylindrically shaped forgings is accomplished in my invention with a resulting structure adapted in shape to properly support two opposite valve ports in rigid axial alignment at a desired distance and inclination to each other.

A valve body of my invention may be produced by the forging of two cylinders of substantially like radial dimensions, each expanded at one end to form the segment of a cylinder which is extended tangentially at each end to support a flat semi-circular strip or area lying in a plane substantially tangential to the surface of each cylinder. At its expanded end, each cylinder terminates in a plane U shaped surface substantially perpendicular to its axis and adapted to be bonded by fusion welding to the like surface of the other cylinder. When thus bonded, the semi-circular strip or area formed tangentially to each cylinder, unite into one flat surface in a plane substantially parallel to the axis of these united cylinders and completely encircling an opening for introducing a gate to two inclined port-supporting faces oppositely disposed about the bore through both cylinders. Upon this surface, the flat end of an annular wall may be welded by the fusion process to produce the gate recess chamber which can be flanged at its other end.

A gate valve body assembled as above described, is illustrated in elevation by Fig. 1. An elevation of the gate recess chamber for this valve body is illustrated in Fig. 2, partly sectioned to show its annular wall and flange.

Fig. 3 is a sectional view of one of the two forged cylindrically shaped forgings used in this construction to form the axially rigid-port-supporting through body of the valve. The center area shown by hatched lines drawn diagonally to the hatched lines of the outer area, represents metal to be bored out later in machining of the valve body, but which can be left in the forging to facilitate that operation and utilized as a seal for making a pressure test of the valve body, where absence of a flange at valve outlet, on cylinders of the welding neck pattern, makes closure for test purposes more difficult.

Fig. 4 is a sectional view of one of the two forged cylinders used in the valve body construction of Fig. 1. This cylinder has a flanged end in place of the welding neck shown in the cylinder of Fig. 3, but is otherwise similar in radial dimensions, the purpose of showing a variation being to illustrate the adaptability of this construction to valve bodies with either flanged or welding neck ends, even in the same valve. The flanged pattern of this forged cylinder is further illustrated in Figures 4A and 4B, showing respectively, a mid-section of the forging in a horizontal plane through its axis and a plan view of the forging looking upon the side designed to contact the gate recess cylinder wall.

Figures 5 and 8 are elevations of gate valve bodies illustrating modifications in design to which the same principles of construction are applicable through this invention. In both these modifications of the invention, the two forgings used in construction of a through barrel for supporting the ports in rigid axial alignment are of semi-cylindrical shape with their contacting surfaces lying in planes parallel to their axes.

Figure 6 is a mid-section in a vertical plane through the lower of the two semi-cylindrical forgings used in assembly of the valve body illustrated in Figure 5 and Figure 6A, is an end view in elevation of the same forging. The right half of Figure 6A shows the forging sectioned at its mid-point in a vertical plane indicated by the broken line on Figure 6 and looking in direction of the arrow thereon. Figure 7 is a mid-section in a vertical plane through the upper of the two semi-cylindrical forgings used in the valve body construction illustrated by Figure 5 and 7A is an end elevation thereof, the right half of which shows this forging sectioned in a vertical plane at its mid-point, as indicated by the broken line on Figure 7, looking in direction of the arrow thereon. At the mid-section of this forging it is pierced by a gate aperture from its outer wall to two inclined port-supporting faces therein.

Figure 9 is the elevation of either one of the two like semi-cylindrical forgings that are bonded together by welding in assembly of the valve body illustrated in Figure 8. In Figure 9, the concave side of said semi-cylindrical forging is shown with a gate-way and gate guide formed mid-way between opposite, inclined port-supporting faces therein. Figure 9A is the section in a plane perpendicular to the cylindrical axis of Figure 9, at the position shown by a broken line on that view and looking in the direction of an arrow thereon. Figure 9B is an end elevation of the same semi-cylindrically shaped forging.

In these drawings: $a$ is a flange optionally provided at the end of one or both cylinder forgings used in the assembly of a valve body of this invention. $b$ designates the shoulder surfaces provided for supporting a valve port and the recess for reception of a port ring, that may be formed in forging the cylinders or semi-cylindrical parts used in a valve body of this invention. $c$ is a flange that can be forged on one end of the annular gate recess chamber wall in a valve body of this construction. $d$ indicates the substantially flat contact surfaces provided on each of the two cylindrical or semi-cylindrical forgings that are adapted for bonding them by fusion welding to produce the axially rigid port-supporting cylinder of this invention. $e$ indicates the substantially flat surface upon the exterior of the assembled port-supporting cylinders to which surface the annular wall of a gate recess chamber can be bonded by fusion welding in a continuous line encircling the gate aperture in said cylinders. $f$ designates the substantially flat surface upon end of the annular wall of a gate recess chamber, adapted for bonding by fusion welding, to the corresponding surface ($e$) upon port-supporting cylinders which have been assembled by a like welding process into an axially rigid through barrel. $g$ represents the flattened surface provided upon the interior of a gate recess chamber and valve body cylinders, to receive gate guides (applied by welding), or the guide itself, if formed integrally in forging the valve body cylinder parts. V is the valve gate recess cylinder including an annular wall, a flange ($c$) at one end, and flat surface ($f$) on the other end, adapted for bonding this wall to a like surface upon the through barrel of the valve by fusion welding. W is typical of one of two cylindrical forgings used in the assembly by fusion welding, of an axially rigid valve port-supporting barrel with welding neck extremities. X is typical of one of two cylindrical forgings used in the assembly by fusion welding, of an axially rigid, valve port-supporting barrel with flanged ends, or in combination with one forged cylinder of the welding neck type. Y is the upper of two semi-cylindrical forgings used in the assembly by fusion welding, of an axially rigid, valve port-supporting barrel. This forging is pierced at its mid-point by a gate aperture, between two opposite inclined port-supporting faces and has an embossed surface $e$, to which the end surface $f$, on the annular wall of a gate recess chamber can be fusion welded. YY is the lower semi-cylindrical forging, bonded to the forging Y, in the formation by fusion welding of an axially rigid, valve port-supporting barrel. Z is one of duplicate semi-cylindrical forgings, used in the assembly by fusion welding, of an axially rigid valve port-supporting barrel.

In all the constructions disclosed by this application, it will be observed that each of the parts separately designated and indicated on the drawings as an integral piece, is adapted to a design that can be easily forged from dies according to established practices. All surfaces and contours of parts required in assembling a gate valve body of this construction can be so tapered as will enable the metal to "draw" in one direction or the other, as necessary to the process of forging. To facilitate the formation of a flanged extension upon the annular walls of these forgings, the surfaces thereof may be tapered as necessary and where this flange is produced upon the end of a cylinder opposite from the port-supporting end, as surrounded by an enlarged wall section, this can be practically accomplished in two successive forging operations upon the same cylinder. This invention enables the formation of a structurally superior gate valve body, by application of only the most economical process of welding to parts more simply forged and requiring less machining than heretofore, in the production of gate valve bodies from wrought metal.

For the above described invention, I claim:

1. A method of making a gate valve body from wrought metal sections each of initially substantially cylindrical form, which comprises flaring one end of each of a pair of said sections having the same bore and forming it to provide a flat U-shaped surface perpendicular to its axis, and a semi-annular face substantially parallel to its axis, forging valve port supporting surfaces and gate guide supporting surfaces upon the interiors of each of said flared sections, then assembling and welding the flared ends of said pair of sections along said U-shaped faces to form a valve barrel in which the semi-annular faces jointly present an annular embossed face, forming gate guide supporting surfaces upon the inner wall of a third section, and welding the third section to the annular face of said valve barrel with its axis perpendicular to the axis of the barrel.

2. In a gate valve body, a substantially cylindrical barrel member comprising a pair of wrought metal tubular sections each being flared by forging to form a flat U-shaped surface substantially perpendicular to the axis of the section, and a semi-annular face substantially parallel to its axis, said sections having valve port supporting surfaces and gate guide supporting surfaces forged upon the interiors of the flared ends, and being united by welding along the U-shaped surfaces to form the barrel, in which the semi-annular faces jointly constitute an annular embossed face substantially tangent to the surface of the barrel, and a cylindrical neck portion welded to the barrel member at said flat annular portion, and having two oppositely disposed gate guide supporting surfaces upon its inner wall in alignment with the corresponding gate guide supporting surfaces of the barrel portion.

3. A method of making a gate valve body from wrought metal sections each of initially substantially cylindrical form, which comprises flaring one end of each of a pair of said sections having the same bore and forming it to provide a flat U-shaped surface substantially perpendicular to its axis, and a semi-annular face substantially parallel to its axis, forging valve port supporting surfaces and gate guide supporting surfaces upon the interiors of each of said flared sections, then assembling and welding the flared ends of said pair of sections along said U-shaped faces to form a valve barrel in which the semi-annular faces jointly present an annular embossed face, and welding a third section to the annular face of said valve barrel with its axis substantially perpendicular to the axis of the barrel.

4. In a gate valve body, a substantially cylindrical valve barrel having a flat annular external portion surrounding a gate valve opening and substantially tangent to the cylindrical surface of the barrel, said barrel comprising a pair of wrought metal tubular sections, each section being flared at one end to provide a flat U-shaped surface substantially perpendicular to its axis and a semi-annular face substantially parallel to its axis, and having valve port supporting surfaces and gate guide supporting surfaces forged upon the interiors of the flared ends, said sections being united by welding along the U-shaped faces to form the valve barrel, in which the semi-annular faces jointly present an annular embossed face, and a third annular forging welded to the flat annular surface of the barrel with its axis substantially perpendicular to the axis of the barrel, said third member constituting substantially the entire neck and flange of the gate recess chamber.

5. A valve gate body as set forth in claim 4, wherein at least one of the component sections of the barrel is provided with an integral bolting flange.

LELAND G. PLANT.